United States Patent [19]

Greenwood

[11] Patent Number: 4,957,676
[45] Date of Patent: Sep. 18, 1990

[54] DETACHMENT OF TIRES FROM MOLDS
[75] Inventor: Alan Greenwood, Kent, Ohio
[73] Assignee: The Goodyear Tire & Rubber Company, Akron, Ohio
[21] Appl. No.: 397,256
[22] Filed: Aug. 23, 1989
[51] Int. Cl.⁵ .............................................. B29C 33/46
[52] U.S. Cl. .................................... 264/102; 264/335; 425/44; 425/58; 425/437; 425/405.1
[58] Field of Search ................ 425/44, 58, 437, 405.1; 264/335, 102

[56] References Cited

U.S. PATENT DOCUMENTS

| | | | |
|---|---|---|---|
| 2,169,146 | 8/1939 | Iverson | 425/437 |
| 2,929,105 | 3/1960 | Starck et al. | 18/42 |
| 3,842,150 | 10/1974 | Carter | 264/102 |
| 4,257,994 | 3/1981 | Leblanc et al. | 264/102 |
| 4,347,212 | 8/1982 | Carter | 264/315 |
| 4,521,367 | 6/1985 | Underwood | 264/335 |
| 4,573,894 | 3/1986 | Blayne et al. | 425/36 |
| 4,595,553 | 6/1986 | Blayne et al. | 264/501 |

FOREIGN PATENT DOCUMENTS 63-67114  3/1988  Japan .
63-264308 11/1988 Japan .
63-278806 11/1988 Japan .

OTHER PUBLICATIONS

English Abstract Only Supplied By Applicant.

Primary Examiner—Willard Hoag
Attorney, Agent, or Firm—T. P. Lewandowski; Frederick K. Lacher

[57] ABSTRACT

Detaching a cured tire from mold sections of a tire mold during opening of the mold by communicating air under pressure into the space between the mold sections and confining the air in this space with a sleeve member supported on the upper mold section and slidably urged into sealing engagement with the lower mold section. Air under pressure is then communicated from the space between the mold sections to the spaces between the cured tire surface and the molding surfaces of the upper and lower mold sections to detach the tire. Sealing rings on the sleeve and on the upper mold section prevent leakage of the air under pressure from the space between the mold section. Spring means between the upper mold section and the sleeve member provide extension of the sleeve member into sealing engagement with the lower mold section.

16 Claims, 7 Drawing Sheets

DETACHMENT OF TIRES FROM MOLDS

This invention relates to the curing of tires in tire molds and especially to molds having two mold sections. One of the problems in curing tires has been detaching of the tires from the mold sections after vulcanization and especially when the molded treads of the cured tires are held in the molds. Vents have been provided in the mold sections for removing air and gases from the mold to the outside atmosphere. This has not been desirable because the rubber is extruded into the vents during the curing process and then the extruded pins must be cut off after the tire is removed from the mold. Providing vents is also costly because of the multiplicity of holes which must be drilled in the mold. In some cases air pressure has been communicated to these vent holes to urge the tire away from the molding surface.

Ventless tires have been proposed where a vacuum is applied to the space between the tire mold sections and this vacuum is then communicated to the space between the green tire and the molding surface. However, no apparatus has been provided to confine a fluid under pressure in the space between the mold sections during opening of a tire mold so that the fluid under pressure may be communicated to the space between the cured tire and the molding surfaces of the tire mold to detach the tire from the mold.

In the present invention, a ventless tire molding apparatus and method has been provided wherein a circular sleeve member carried by the upper mold section is automatically extended to maintain a seal with the lower mold section. Openings in the lower mold section are connected to a manifold in communication with a port in the lower mold section for communicating air under pressure to the space within the sleeve member. This manifold can also be used to communicate a vacuum to the space between the green tire and the molding surface upon closing of the mold. Accordingly the vents to provide a vacuum for removing air and gases on closing of the mold and for applying pressure on the cured tire surface to detach the tire upon opening of the mold are no longer needed. Costly drilling of a multiplicity of vent holes in the molds is also not needed.

In accordance with one aspect of the invention there is provided apparatus for applying vacuum to an uncured tire and detaching a cured tire from a heated mold having a first mold section and a second mold section comprising:

(a) a circular sleeve member slidably mounted on the first mold section having an edge portion with a sealing means for engaging an opposing surface of the second mold section upon extension of the sleeve member;

(b) means for opening the mold to separate the first mold section and the second mold section;

(c) means for simultaneously extending the sleeve member toward the second mold section to maintain engagement of the edge portion with the opposing surface of the second mold section and sealing the space between the first mold section and the second mold section;

(d) means for communicating the vacuum or the fluid under pressure to the space between the first mold section and the second mold section so that the vacuum will remove gases from the mold and the fluid under pressure will be communicated to the space between the cured tire and molding surfaces of the first mold section and the second mold section at the center of the tread to peel the tread away from the molding surfaces and push the cured tire away from the molding surfaces; and (e) stop means for arresting the extension of the sleeve member and retaining the sleeve member on the first mold section.

In accordance with another aspect of the invention there is provided a method of applying vacuum to an uncured tire and detaching a cured tire from a mold having a first mold section and a second mold section with a circular sleeve member slidably mounted on the first mold section having an edge portion for engaging an opposing surface of the second mold section during separation of the first mold section and the second mold section and during extension of the sleeve member comprising:

(a) separating the first mold section from the second mold section;

(b) extending the sleeve member to maintain engagement of the edge portion with the opposing surface of the second mold section and sealing the space between the first mold section and the second mold section;

(c) communicating the vacuum or the fluid under pressure to the space between the first mold section and the second mold section so that the vacuum will remove gases from the mold and fluid under pressure from the space between the first mold section and the second mold section will be communicated to the space between the cured tire and molding surfaces of the first mold section and the second mold section to peel the tread away from the molding surfaces and push the cured tire away from the molding surfaces; and (d) arresting the extension of the sleeve member and retaining the sleeve member on the first mold section.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

BRIEF DESCRIPTION OF THE DRAWINGS

Referring to FIG. 1, a tire mold 10 is shown having a first or upper mold section 12 and a second or lower mold section 14 which are adapted for mounting in a tire press so that the mold sections can be separated and brought together by movement of the press members to which the mold sections are attached. In the embodiment shown in FIGS. 1 and 2, the mold sections are held together by shipping straps 16 bolted to the first mold section 12 and second mold section 14 at circumferentially spaced positions around the mold 10. The mold 10 can then be installed in the tire press as a unit with the mold sections 12 and 14 in alignment after which the shipping straps 16 can be removed.

Figure 1:
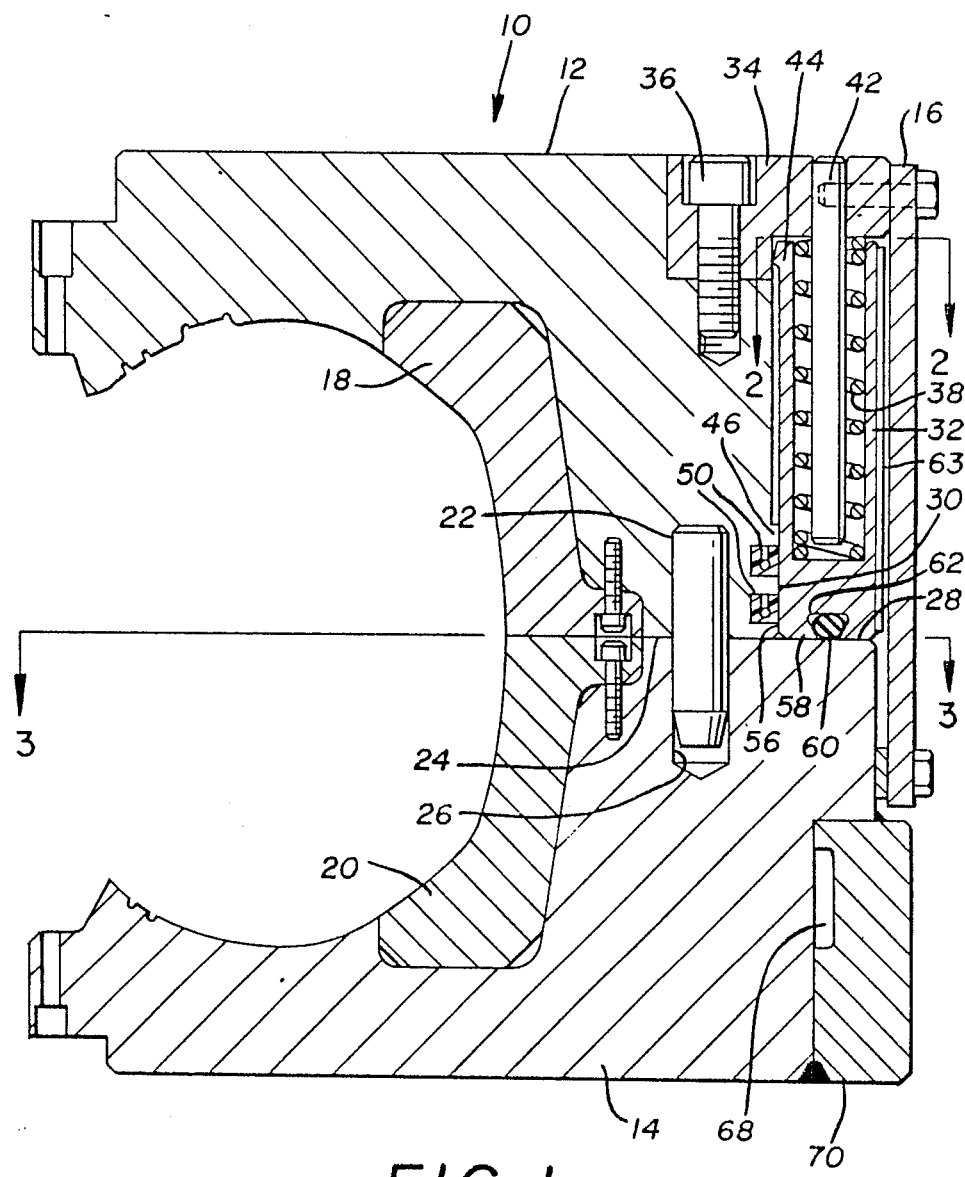
FIG. 1 is a fragmentary sectional view of a tire mold embodying the invention with the shipping straps attached and the locating pin and pin socket being shown circumferentially offset into the plane of one of the shipping straps.
Figure 2:
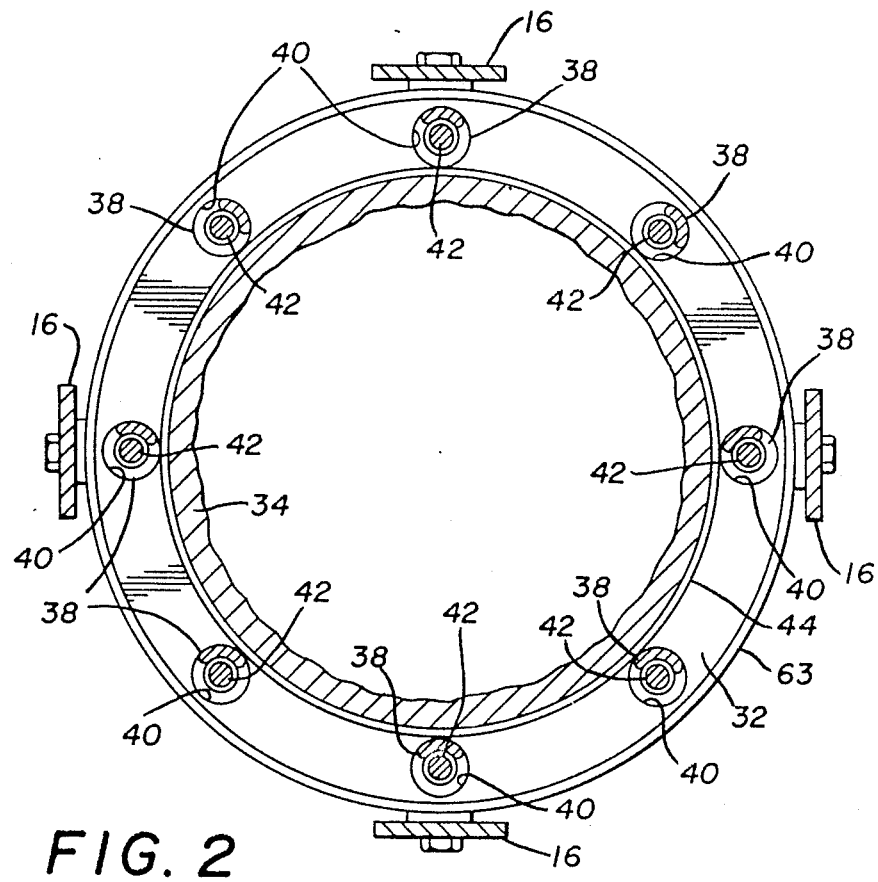
FIG. 2 is a schematic fragmentary plan view of the sealing sleeve taken along line 2—2 in FIG. 1.
Figure 3:
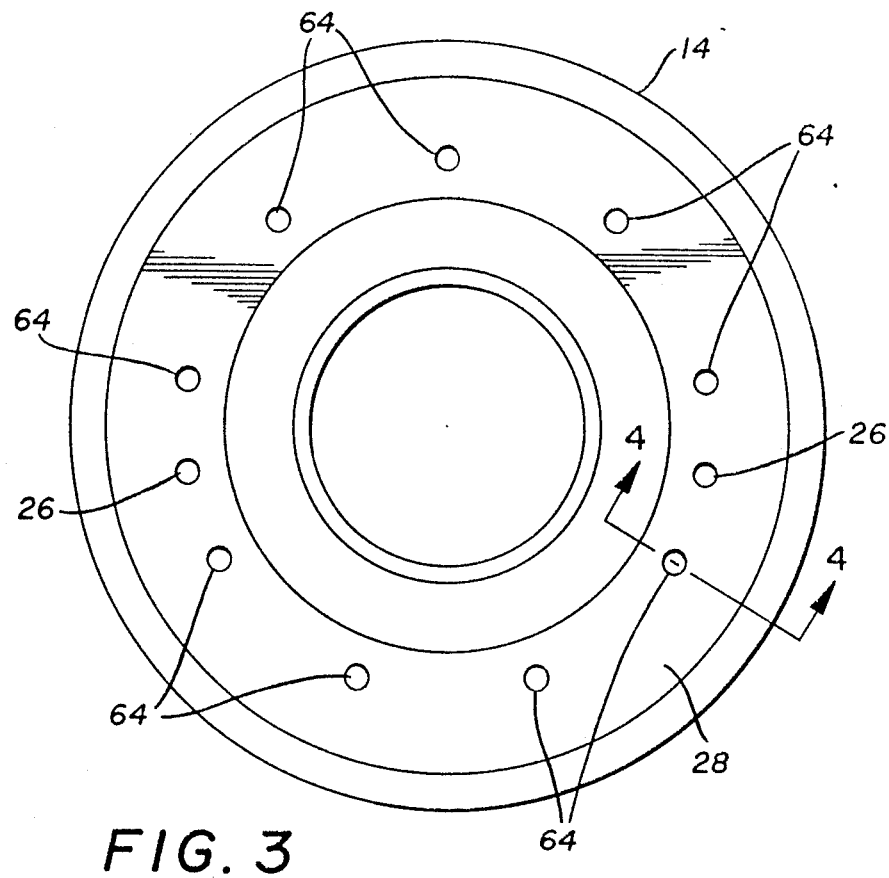
FIG. 3 is a schematic plan view of the bottom mold section taken along line 3—3 in FIG. 1 with the shipping straps removed.
Figure 4:
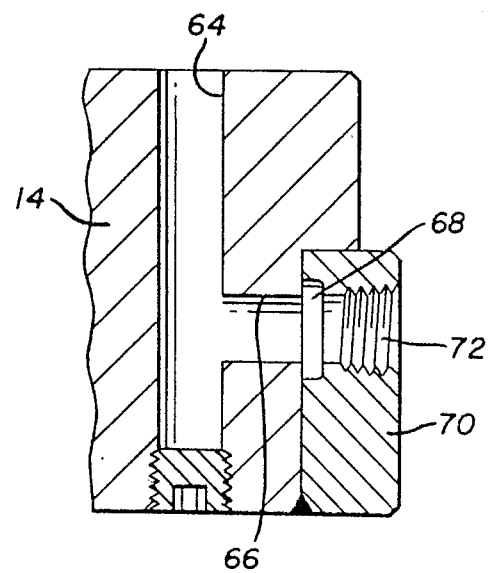
FIG. 4 is an enlarged fragmentary sectional view of the lower mold section showing the connecting port and manifold ring taken along line 4—4 in FIG. 3.

A tread ring 18 is mounted on the upper mold section 12 and a tread ring 20 is mounted on the lower mold section 14 for molding the nonskid tread surface on a tire. Locating pins 22 are mounted in a lower parting line surface 24 of the upper mold section 12 for insertion into at least two pin sockets 26 in an opposing surface such as upper parting line surface 28 of the lower mold section 14 as shown in FIGS. 1 and 3. These pins 22 keep the mold sections 12 and 14 in alignment during installation and operation.

The upper mold section 12 has an outer surface 30 of reduced diameter over which a circular sleeve member 32 is positioned for slidable movement into engagement with the upper parting line surface 28 of the lower mold section 14. A projecting flange member such as circular flange 34 is mounted in overlapping relationship with the circular sleeve member 32 at the upper edge of the upper mold section 12 and may be fastened to the mold section by screws 36 circumferentially spaced around the upper mold section. Interposed between the circular flange 34 and the sleeve member 32 are spring means such as coil springs 38 seated in holes 40 circumferentially spaced around the sleeve member 32. Guide rods 42, mounted on the circular flange 34, extend downwardly through the coil springs 38 for holding the springs in position during operation. Stop means for limiting the extension of the sleeve member 32 and holding it on the upper mold section 12 during opening of the mold may include an inwardly extending rim 44 on the sleeve member movable into engagement with a ledge 46 on the outer surface 30 of the upper mold section 12.

Figure 9:
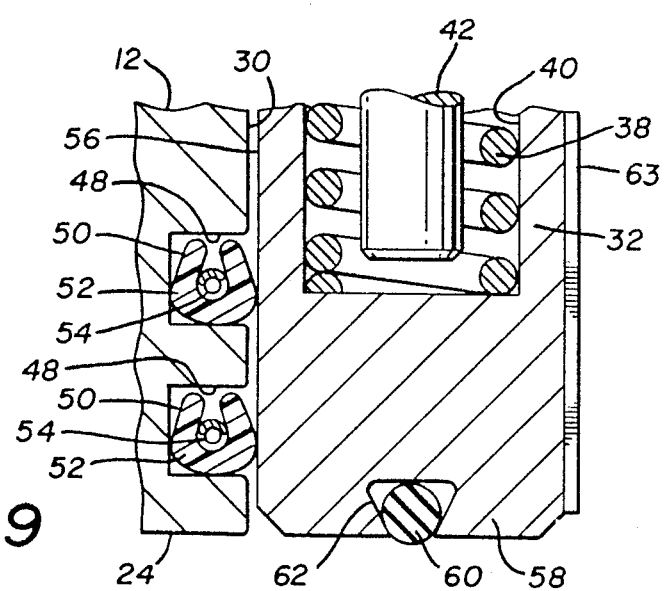
FIG. 9 is an enlarged fragmentary sectional view of the seals in the upper mold section and the lower edge portion of the circular sleeve member.

In order to seal the space between the circular sleeve member 32 and the upper mold section 12 and lower mold section 14, sealing means between these parts must be provided. As shown more clearly in FIGS. 1 and 9, grooves 48 in the outer surface 30 of the upper mold section 12 are located between the ledge 46 and the lower parting line surface 24 for supporting sealing rings 50 which may be circular channels 52 of resilient rubberlike material supported on a circular spring member 54. The circular sleeve member 32 has a radially inner surface 56 which is engageable with the resilient channels 52 for slidably sealing the space between the sleeve member 32 and the upper mold section 12.

The circular sleeve member 32 has a lower edge portion 58 engageable with the lower mold section 14 in which sealing means such a an O-ring 60 of resilient rubberlike material is contained in a circular dovetail groove 62 so that when the sleeve member 32 is extended into engagement with the upper parting line surface 28 of the lower mold section 14, the O-ring will be compressed and seal the space between the sleeve member and the lower mold section.

Suitable heating means such as an electric strip heater 63 may be mounted on the outer surface of the sleeve member 32 for heating and expanding the sleeve member as the upper mold section 12 is heated and expanded.

In order to communicate fluid such as air pressure and vacuum to the space between the upper mold section 12 and lower mold section 14, openings 64 are provided in the upper parting line surface 28 of the lower mold section. The openings 64 are connected by passages 66 to a manifold 68 in a manifold ring 70 mounted on the lower mold section 14. A port 72 extends through the manifold ring 70 into communication with the manifold 68 and may be connected to suitable piping for communicating vacuum and air pressure to the manifold.

Referring to FIGS. 5 through 8, schematic drawings showing the operation of the press containing the mold 10 of this invention are shown. The mold 10 is heated and a section of a tire 74 being cured in the mold is shown. Piping 76 is also shown connecting the port 72 to a vacuum valve 78 leading to a source of vacuum (not shown) and to a pressure valve 80 leading to a source of fluid pressure (not shown).

Figure 5:
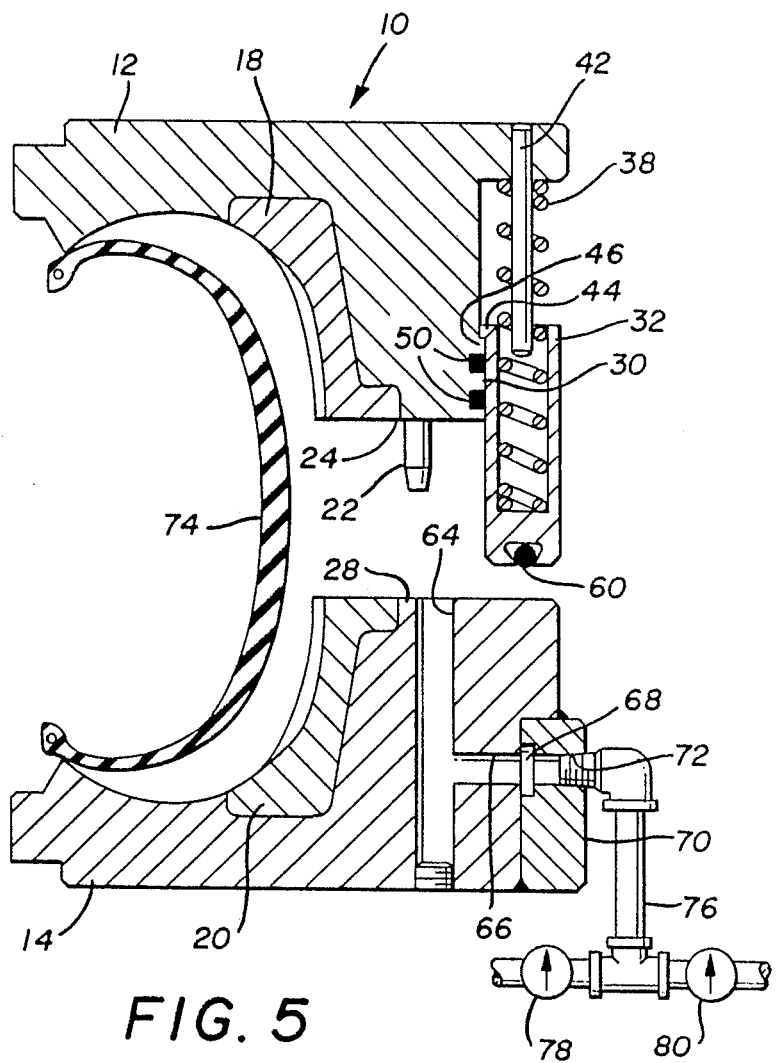
FIGS. 5, 6, 7 and 8 are schematic sectional views like FIG. 1 taken along the plane of line 4—4 in FIG. 3 showing the sequence of operations during the closing and opening of the mold.
Figure 6:
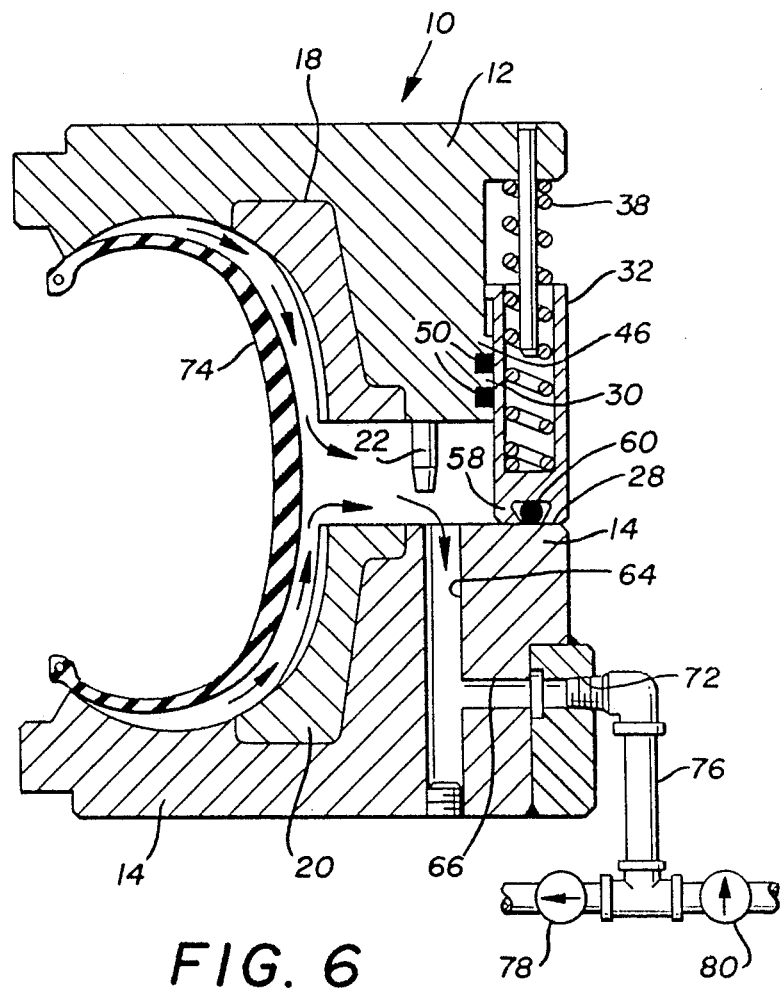
Figure 7:
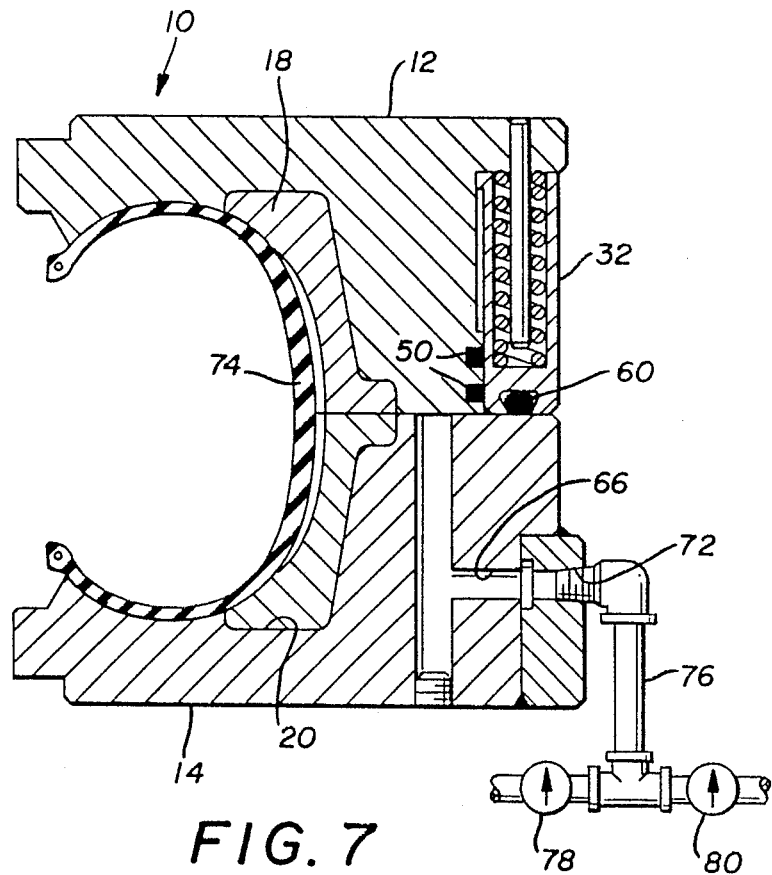

In FIG. 5, the uncured tire 74 has been placed in the lower mold section 14 and the upper mold section 12 lowered into contact with the tire. The vacuum valve 78 and the pressure valve 80 are shut off until the sleeve member 32 which is fully extended under spring pressure engages the upper parting line surface 28 of the lower mold section 14 as shown in FIG. 6. The coil springs 38 maintain pressure on the sleeve member 32 to hold the edge portion 58 in engagement with the upper parting line surface 28 and compress the O-ring 60 to provide a seal. The sealing rings 50 in the outer surface 30 of the upper mold section 12 provide sealing between the sealing ring 32 and the upper mold section. The closing of the press is then stopped and the vacuum valve 78 opened communicating vacuum to the piping 76, the port 72, passages 66 and openings 64, and thereby venting air and gases from the space between the tire 74 and the mold sections 12 and 14 as shown by the arrows in FIG. 6. The vacuum is communicated to the space between the tire 74 and the mold sections 12 and 14 until the desired amount of vacuum is provided after which the mold is closed as shown in FIG. 7. The vacuum valve 78 and the pressure valve 80 are closed during the vulcanization of the tire 74.

Figure 8:
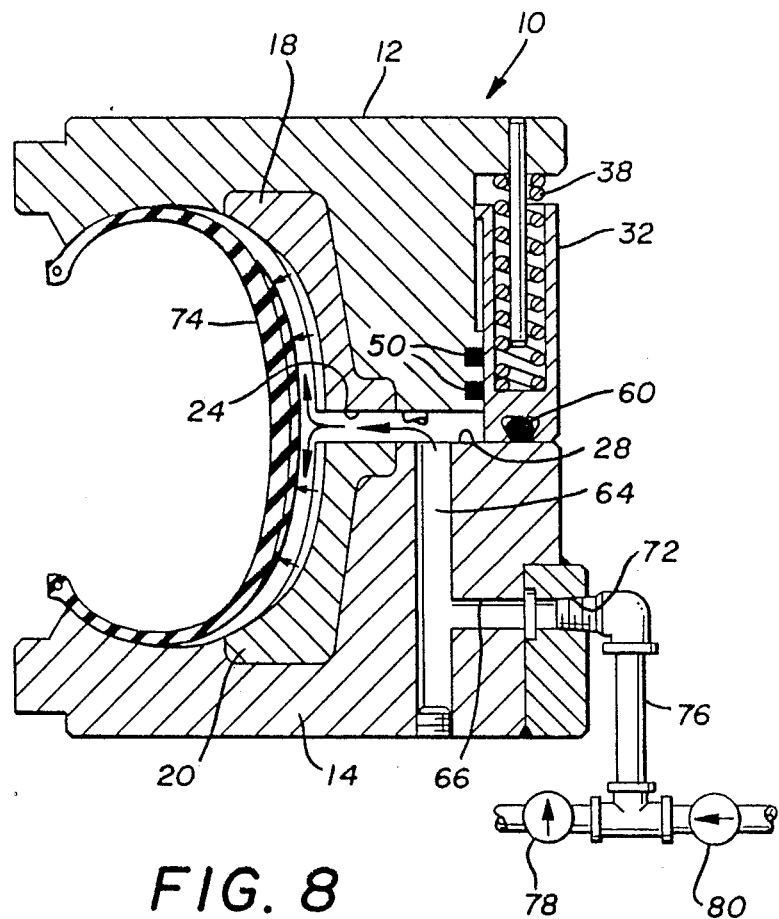

Immediately prior to opening of the mold 10 and the separation of the upper mold section 12 from the lower mold section 14, as shown in FIG. 8, the pressure valve 80 is opened communicating fluid pressure such as air pressure through the piping 76, the port 72, passages 66 and openings 64 to the space between lower parting line surface 24 of the upper mold section 12 and the upper parting line surface 28 of the lower mold section 14. As shown by the arrows, this pressure is immediately communicated to the tire 74 at the center of the tread surface, pushing and peeling the tread away from the molding surface of the tread rings 18 and 20 to detach the tire from the mold 10. By peeling the tread away from the tread molding surfaces, tearing of the nonskid surfaces of the tread is avoided as the mold sections 12 and 24 are separated. The coil springs 38 urge the circular sleeve member 32 toward the lower mold section 14 with the O-ring 60 in sealing engagement with the upper parting line surface 28 of the lower mold section. At the same time the sealing rings 50 are in sealing engagement with the inner surface 56 of the sleeve member 32 for sealing the space between the upper mold section 12 and lower mold section 14. Preferably, the air pressure applied is in the range of 40 psi (2.8 kg/cm$^2$) to 60 psi (4.2 kg/cm$^2$). This pressure is applied until the sleeve member 32 is disengaged from the lower mold section 14.

It can be seen that with this construction and method there is no longer any need for venting the tire mold 10. Also the tire 74 produced with this mold need not be trimmed to remove extruded pins. Furthermore, detachment of the tire is provided without tearing of the nonskid tread surface.

While a certain representative embodiment and details have been shown for the purpose of illustrating the invention, it will be apparent to those skilled in the art that various changes and modifications may be made therein without departing from the spirit or scope of the invention.

What is claimed is:

1. Apparatus for applying vacuum or fluid under pressure to an uncured tire and detaching a cured tire from a heated mold having a first mold section and a second mold section comprising:
   (a) an extendible circular sleeve member slidably mounted on said first mold section having an edge portion with a sealing means for engaging an opposing surface of said second mold section upon extension of said sleeve member;
   (b) means for opening said mold to separate said first mold section and said second mold section;
   (c) means for simultaneously extending said sleeve member toward said second mold section to maintain engagement of said edge portion with said opposing surface of said second mold section and sealing the space between said first mold section and said second mold section;
   (d) means for communicating said vacuum or said fluid under pressure to said space between said first mold section and said second mold section so that said vacuum will remove gases from said mold and said fluid under pressure will be communicated to the space between said cured tire and molding surfaces of said first mold section and said second mold section at the center of the tread to peel the tread away from said molding surfaces and push said cured tire away from said molding surfaces; and
   (e) stop means for arresting the extension of said sleeve member and retaining said sleeve member on said first mold section.

2. Apparatus in accordance with claim 1 wherein said circular sleeve member has an inner surface with an inner diameter substantially the same as the outer diameter of an outer surface of said first mold section, a first sealing means is located between said sleeve member and said first mold section to slidably seal the space between said inner surface of said sleeve member and said outer surface of said first mold section, and a second sealing means is located between said edge portion and said opposing surface to seal the space between said sleeve member and said second mold section.

3. Apparatus in accordance with claim 2 wherein said means for extending said sleeve member toward said second mold section comprises spring means interposed between said sleeve member and said first mold section.

4. Apparatus in accordance with claim 3 wherein said spring means includes a plurality of coil springs positioned in a plurality of circumferentially spaced openings in a second edge portion of said sleeve member and said first mold section has a projecting flange member engageable with said coil springs.

5. Apparatus in accordance with claim 4 wherein each of said coil springs has a guide rod extending through each of said coil springs and mounted on said projecting flange member for supporting each of said coil springs during extension of said sleeve member.

6. Apparatus in accordance with claim 2 wherein said first sealing means comprises at least one sealing ring of resilient material located in said outer surface of said first mold section.

7. Apparatus in accordance with claim 6 wherein said first sealing means includes two sealing rings of resilient material located in said outer surface of said first mold section at spaced-apart positions in the proximity of the parting line surface of said first mold section so that said rings are always in engagement with said sleeve member to protect said rings.

8. Apparatus in accordance with claim 6 wherein said second sealing means comprises at least one sealing ring of resilient material located in said edge portion of said sleeve member for sealing engagement with said opposing surface of said second mold section.

9. Apparatus in accordance with claim 2 wherein said stop means includes a rim member on said inner surface of said sleeve member for engagement with a ledge member on said outer surface of said first mold section.

10. Apparatus in accordance with claim 1 wherein said means for communicating fluid under pressure includes circumferentially spaced-apart openings in said opposing surface of said second mold section having passages connected to a circumferentially extending manifold in said second mold section and a port in said second mold section connecting said manifold and a source of fluid pressure or vacuum.

11. Apparatus in accordance with claim 1 wherein a heater is mounted on said sleeve member for expanding said sleeve member as said first mold section is heated and expanded.

12. Apparatus for applying vacuum to an uncured tire and detaching a cured tire from a heated mold having a first mold section and a second mold section comprising:
   (a) a circular sleeve member having an inner surface with an inner diameter substantially the same as the outer diameter of an outer surface of said first mold section;
   (b) an edge portion of said sleeve member for engaging an opposing surface of said second mold section;
   (c) means for extending said sleeve member toward said second mold section to bring said edge portion into engagement with said opposing surface of said second mold section including a plurality of coil springs positioned in a plurality of circumferentially spaced openings in a second edge portion of said sleeve member for engaging a projecting flange member on said first mold section with each of said coil springs having a guide rod extending through each of said coil springs and mounted on said projecting flange member for supporting each of said coil springs in an extended position of said sleeve member;

(d) a first sealing means located between said sleeve member and said first mold section to seal the space between said inner surface of said sleeve member and said outer surface of said first mold section including two sealing rings of resilient material located in said outer surface of said first mold section at spaced-apart positions in the proximity of the parting line surface of said first mold section so that said sealing rings are covered by said sleeve member to protect said rings;

(e) a second sealing means located between said edge portion and said opposing surface to seal the space between said sleeve member and said second mold section including at least one sealing ring of resilient material mounted in said edge portion of said sleeve member for sealing engagement with said opposing surface of said second mold section;

(f) means for communicating said vacuum or said fluid under pressure to said space between said first mold section and said second mold section so that said vacuum will remove gases from said mold and said fluid under pressure will be communicated to the space between said cured tire and molding surfaces of said first mold section and said second mold section at the center of the tread to peel the tread away from said molding surfaces and push said cured tire away from said molding surfaces;

(g) stop means including a rim member on said inner surface of said sleeve member for engagement with a ledge member on said outer surface of said first mold section to limit the extension of said sleeve member and retain said sleeve member on said first mold section; and (h) heating means mounted on said sleeve member for expanding said sleeve member as said first mold section is expanded.

13. A method of applying vacuum to an uncured tire and detaching a cured tire from a heated mold having a first mold section and a second mold section with a circular sleeve member slidably mounted on said first mold section having an edge portion for engaging an opposing surface of said second mold section during separation of said first mold section and said second mold section and during extension of said sleeve member comprising:

(a) separating said first mold section from said second mold section;

(b) extending said sleeve member to maintain engagement of said edge portion with said opposing surface of said second mold section and sealing the space between said first mold section and said second mold section;

(c) communicating a vacuum or fluid under pressure to said space between said first mold section and said second mold section so that said vacuum will remove gases from said mold and fluid under pressure from said space between said first mold section and said second mold section will be communicated to the space between said cured tire and molding surfaces of said first mold section and said second mold section to peel the tread away from said molding surface and push said cured tire away from said molding surfaces; and (d) arresting the extension of said sleeve member and retaining said sleeve member on said first mold section.

14. A method in accordance with claim 13 wherein said fluid under pressure is air under a pressure of from 40 psi (2.8 kg/cm$^2$) to 60 psi (4.2 kg/cm$^2$).

15. A method in accordance with claim 13 wherein said fluid under pressure is communicated to said space immediately prior to separating said first mold section from said second mold section to detach said cured tire.

16. Apparatus for applying vacuum to an uncured tire and for applying pressure to a cured tire for detaching said cured tire from a heated mold having a first mold section and a second mold section comprising:

(a) means for opening said mold to separate said first mold section and said second mold section;

(b) extendible means for enclosing and sealing the space between said first mold section and said second mold section upon opening and closing of said mold;

(c) means for communicating said vacuum or said fluid under pressure to said space between said first mold section and said second mold section so that said vacuum will remove gases from said mold and said fluid under pressure will be communicated to the space between said cured tire and molding surfaces of said first mold section and said second mold section at the center of the tread to peel the tread away from said molding surfaces and push said cured tire away from said molding surfaces.

* * * * *